Figure 1:
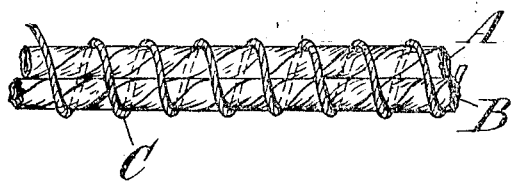

T. SLOPER.
COMPOUND CORD FOR USE IN CORD FABRICS.
APPLICATION FILED AUG. 20, 1908.

913,856.

Patented Mar. 2, 1909.
2 SHEETS—SHEET 1.

Witnesses
G. P. Kramer
T. J. McCarthy

Inventor
Thomas Sloper
by Fiske, Freeman, Watson & Coit,
Attorneys.

T. SLOPER.
COMPOUND CORD FOR USE IN CORD FABRICS.
APPLICATION FILED AUG. 20, 1908.
913,856.
Patented Mar. 2, 1909.
2 SHEETS—SHEET 2.
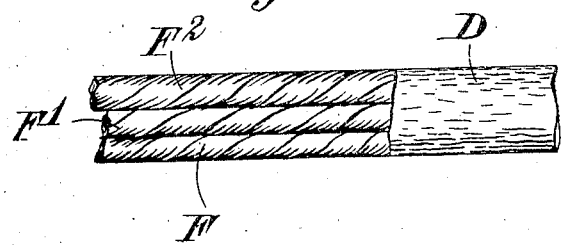
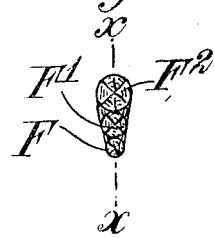
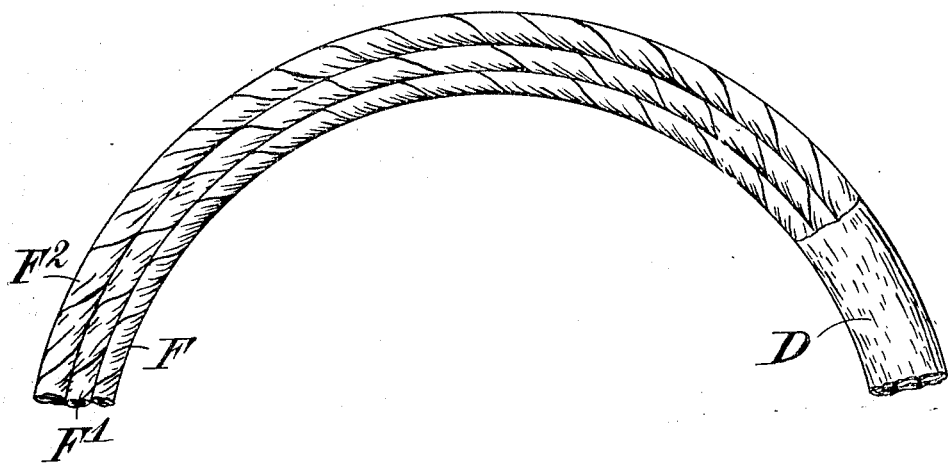
Witnesses
Inventor
Thomas Sloper

UNITED STATES PATENT OFFICE.

THOMAS SLOPER, OF DEVIZES, ENGLAND.

COMPOUND CORD FOR USE IN CORD FABRICS.

No. 913,856.     Specification of Letters Patent.     Patented March 2, 1909.

Application filed August 20, 1908. Serial No. 449,482.

*To all whom it may concern:*

Be it known that I, THOMAS SLOPER, a subject of the King of England, and residing at Devizes, England, have invented certain new and useful Improvements in Compound Cords for Use in Cord Fabrics, of which the following is a specification.

This invention is for improvements in or relating to compound cords used in the manufacture of cord-fabrics and is particularly applicable to the manufacture of pneumatic tires from rubbered cords of oblong or like cross-section, on the lines described in my earlier patent specification No. 799374.

In the manufacture of tires of small or medium cross-section it is usually sufficient to flatten a round cord by passing it between rollers and to build the same into the fabric without further manipulation. For heavy tires however, it is an advantage to employ a compound cord, that is, a cord built up of two or more individual cords secured together by suitable means such as are hereinafter described and this introduces difficulties which it is the object of the present invention to overcome.

It will be understood that the more a cord is flattened, the greater the number of folds that can be built into a layer of fabric but there is a limit beyond which any further flattening weakens the cord. Moreover a large cord cannot with advantage be flattened to the same percentage of its diameter as a smaller cord, because the process of flattening causes the cord to contract longitudinally which gives it an extensibility that renders it liable to lengthen when in use in the tire, and it is the object of the present invention to produce a cord composed of elements having different degrees of extensibility, in order that when the fabric has been built into the curved form required, all the individual cords composing the compound cord may take approximately equal shares of the strain.

The first part of this invention relates to a compound cord that is composed of two or more individual cords or strands secured together and having different degrees of extensibility so that when in position in a fabric the individual strands may take approximately equal shares of the strain.

A further feature consists in building the compound cord of two or more individual strands laid side by side and secured together, the strand having the least extensibility being placed at one side of the compound cord and that having the greatest extensibility being placed at the other side. Such a compound cord is suitable for building a fabric of curved cross-section, as in bending the cords to the required curve the strand of least extensibility is kept at that side whereon the short bend is formed and the individual wider strand of greatest extensibility is kept at that side which takes the longer bend, this arrangement equalizes the strains on the strands as their degrees of extensibility are made proportional to the positions they are to occupy.

The compound cords to which this invention relates are of oblong or like cross-section, having a greater and a lesser diameter although the actual contour of the cross-section of the cord may vary considerably. For instance, in some cases the individual cord or strand at one side of the compound cord may be smaller than that at the other side, so that a cord of approximately wedge-shaped cross-section is obtained but whatever the precise cross-section it will be understood that it always approximates to an oblong or oval and such cord is built into the fabric on edge, that is to say, that the longer diameter is disposed approximately at right angles to the surface of the fabric.

Any suitable means may be employed for rendering the individual cords extensible, such as varying the twist given to the fibers composing the individual cords, or in the case of rubbered cords, the quantity of rubber employed with the fiber may be varied for the same purpose.

Figure 2:
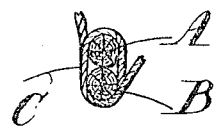
Figure 3:
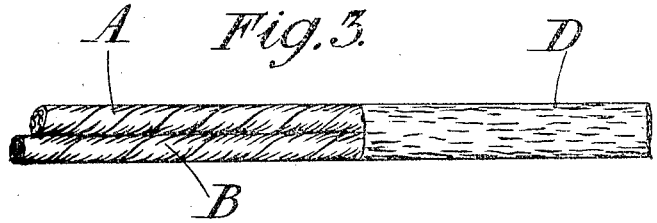
Figure 4:
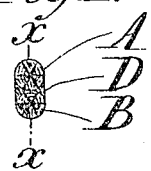
Figure 5:
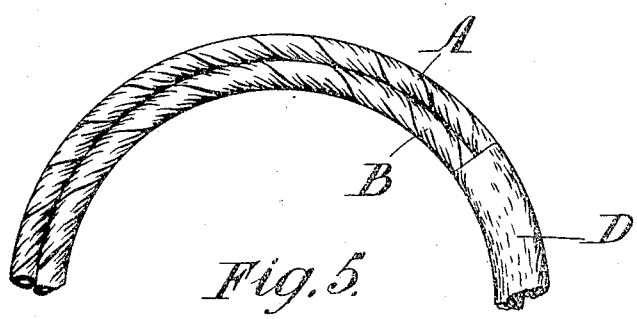
Figure 6:
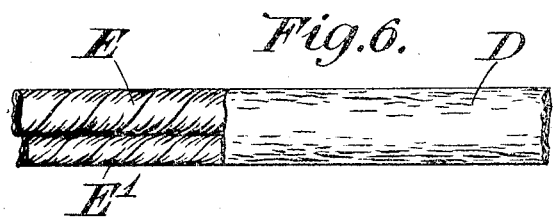
Figure 7:

In the accompanying drawings:—Figure 1 shows in elevation, a compound cord composed of two individual cords secured together according to one method of carrying out this invention, Fig. 2 is a cross-section of the same, Fig. 3 is an elevation of a similar compound cord wherein the individual elements are secured together by different means, Fig. 4 is a cross-section of the same, Fig. 5 shows the same cord after bending, Fig. 6 is an elevation of a modified compound cord, Fig. 7 is a transverse section of the same, Fig. 8 is an elevation of another modified form of cord, Fig. 9 is a transverse section of the same, and Fig. 10 is an elevation of the same cord after it has been bent.

Like letters indicate like parts throughout the drawings.

The compound cord shown in Figs. 1 and 2 comprises two elements only A and B respectively. These individual cords or strand-elements are secured together by a binding thread C as described in the specification of U. S. Letters Patent No. 783,574. Another method of securing the individual cords together is shown in Figs. 3 and 4 wherein rubber cement indicated at D is employed. One of the individual cords, for example the cord A, of the two compound cords referred to has a greater degree of extensibility than the other cord B and in curving the compound cord to build it into the fabric, the cord B, which has the lesser degree of extensibility, is kept on that side which takes the shorter bend, while the cord A of greater extensibility lies on the side that takes the longer bend, the longer diameter $x\ x$ (Fig. 4) being maintained approximately at right angles to the surface of the fabric.

In Figs. 6 and 7 a compound cord is shown comprising elements E E', whereof E is flattened to render it more extensible than E' and moreover, the element E is of greater cross-sectional area than E'.

More than two individual cords or strands may be employed in building up the compound cord as shown in Figs. 8 to 10 and the individual cords may be graduated in size as at F, $F^1$, $F^2$, and so arranged that the smallest cord F lies at one side of the compound cord and the largest individual cord $F^2$ lies at the other side, resulting in a cord of somewhat wedge-shaped cross-section. This cord, as with the others, is built into the fabric on edge, that is, with its greater diameter $x\ x$ (Fig. 9) approximately at right angles to the surface of the fabric and when built into a tire so that the whole fabric forms an annulus of curved cross-section, the narrower edge of this cord is kept toward the center of the annulus and the wider portion thus fills the greater circumference provided by the thickness of the fabric and enables a smooth finish to be given to the exterior. Each of the cords F, $F^1$, $F^2$ may have different degrees of extensibility, the cord F which is to lie on the inside of the bend as shown in Fig. 10 having the least degree of extensibility and the cord $F^2$ the greatest.

The cord thus produced may be used in the manufacture of a pneumatic tire, hose pipe or other fabric having a curved cross-section, such cords being composed of elements or strands having different degrees of extensibility or different lengths or sizes and so proportioned that when built into the finished article, each element takes approximately its proper share of the strain. The twist of the strands composing the cord need not be in the same direction with all as some may be formed with a right hand and others with a left hand twist these being preferably arranged alternately i. e. one with a left hand twist next to one with a right hand twist and so on.

The term strand is used throughout for either a simple or compound element which is combined with others to form the compound cord.

What I claim as my invention and desire to secure by Letters Patent is:—

1. In a cord the combination of a plurality of strands of different degrees of extensibility laid side by side and secured together to form a single cord their arrangement being in the order of their respective degrees of extensibility whereby a cord is provided that is more extensible on one side than on the other, for the purpose described.

2. In a cord of approximately oval cross-section the combination of, a plurality of strands of different degrees of extensibility laid side by side and secured together to form a single cord their arrangement being in the order of their respective degrees of extensibility the strand of least extensibility being at one end of the oval cross-section and that of greatest extensibility at the opposite end, for the purpose described.

3. In a cord of approximately oval cross-section and intended to be employed in a bent form with one end of the oval cross-section toward the smaller or inner bend and the other toward the larger or outer bend, of a plurality of strands of different degrees of extensibility laid side by side and secured together to form a single cord their arrangement being in the order of their respective degrees of extensibility the strand of least extensibility being at one end of the oval cross-section and that of greatest extensibility at the opposite end the degrees of extensibility being so chosen that when the cord is bent to the required shape all the strands are under approximately equal tension, substantially as set forth.

4. In a cord the combination of, a plurality of twisted strands of different degrees of extensibility laid side by side and secured together to form a single cord their arrangement being in the order of their respective degrees of extensibility whereby a cord is provided that is more extensible on one side than on the other, for the purpose described.

5. In a cord the combination of, a plurality of twisted strands having different degrees of twist according to the degree of extensibility each strand is required to have laid side by side and secured together to form a single cord their arrangement being in the order of their respective degrees of twist or extensibility whereby a cord is provided that is more extensible on one side than on the other, for the purpose described.

6. In a cord of approximately oval cross-section the combination of, a plurality of twisted strands having different degrees of twist according to the degree of extensibility each strand is required to have, laid side by side and secured together to form a single cord their arrangement being in the order of their respective degrees of twist or extensibility that having the least twist or extensibility being at one end of the oval cross-section and that of greatest twist or extensibility at the opposite end, for the purpose described.

In testimony whereof I have signed my name to this specification in the presence of two subscribing witnesses.

THOMAS SLOPER.

Witnesses:
   H. PARSONS,
   ARTHUR CHATHAM.